US010365749B2

(12) United States Patent
Shahrokhi et al.

(10) Patent No.: US 10,365,749 B2
(45) Date of Patent: Jul. 30, 2019

(54) CAPACITIVE SENSING DEVICE WITH SINGLE REFERENCE CHANNEL

(71) Applicant: SYNAPTICS INCORPORATED, San Jose, CA (US)

(72) Inventors: Farzaneh Shahrokhi, Boston, MA (US); Adam L. Schwartz, Redwood City, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 350 days.

(21) Appl. No.: 15/085,838

(22) Filed: Mar. 30, 2016

(65) Prior Publication Data

US 2017/0285833 A1 Oct. 5, 2017

(51) Int. Cl.
*G06F 3/044* (2006.01)
*G06F 3/041* (2006.01)

(52) U.S. Cl.
CPC ............ *G06F 3/0416* (2013.01); *G06F 3/044* (2013.01)

(58) Field of Classification Search
None
See application file for complete search history.

(56) References Cited

U.S. PATENT DOCUMENTS

| | | | | |
|---|---|---|---|---|
| 5,400,363 A | * | 3/1995 | Waugh | ................ H04L 27/2273 329/308 |
| 5,565,658 A | * | 10/1996 | Gerpheide | .............. G06F 3/041 178/18.02 |
| 7,301,350 B2 | | 11/2007 | Hargreaves et al. | |
| 7,414,552 B2 | * | 8/2008 | Chou | ................... H03G 3/3084 341/118 |
| 7,423,437 B2 | | 9/2008 | Hargreaves et al. | |
| 7,977,954 B2 | | 7/2011 | Reynolds et al. | |
| 8,237,456 B2 | | 8/2012 | Dubery | |
| 8,493,356 B2 | | 7/2013 | Joharapurkar et al. | |
| 8,766,950 B1 | * | 7/2014 | Morein | ................. G06F 3/0416 345/173 |

(Continued)

FOREIGN PATENT DOCUMENTS

EP 1521090 A2 4/2005
WO WO-2004066498 A1 8/2004

*Primary Examiner* — Chanh D Nguyen
*Assistant Examiner* — Karin Kiyabu
(74) *Attorney, Agent, or Firm* — Patterson + Sheridan, LLP

(57) ABSTRACT

An example a processing system for a capacitive sensing device includes a reference transmitter coupled to a reference capacitance. The processing system further includes a charge accumulation circuit having an input coupled to the reference transmitter through the reference capacitance and configured to generate an integrated signal, a demodulator circuit having an input coupled to an output of the charge accumulation circuit and configured to demodulate the integrated signal to generate at least one demodulated signal, a sampling circuit having an input coupled to an output of the demodulator circuit and configured to sample the demodulated signal(s), a first reference buffer coupled to an output of the sampling circuit, the first reference buffer outputting a first voltage reference for the capacitive sensing device, and a second reference buffer coupled to the output of the sampling circuit, the second reference buffer outputting a second voltage reference for the capacitive sensing device.

20 Claims, 9 Drawing Sheets

(56) References Cited

U.S. PATENT DOCUMENTS

| | | | |
|---|---|---|---|
| 8,970,546 B2 | 3/2015 | Schwartz et al. | |
| 9,013,429 B1* | 4/2015 | Krekhovetskyy | G06F 3/03545 |
| | | | 345/173 |
| 9,285,902 B1* | 3/2016 | Kremin | G06F 3/044 |
| 9,383,395 B1* | 7/2016 | Ogirko | G01R 27/2605 |
| 9,690,408 B1* | 6/2017 | Krah | G06F 3/0412 |
| 2005/0068045 A1* | 3/2005 | Inaba | G01R 27/2605 |
| | | | 324/678 |
| 2005/0099188 A1 | 5/2005 | Baxter | |
| 2005/0151677 A1* | 7/2005 | Chou | H03G 3/3084 |
| | | | 341/122 |
| 2006/0022682 A1 | 2/2006 | Nakamura et al. | |
| 2007/0075710 A1* | 4/2007 | Hargreaves | G01R 27/2605 |
| | | | 324/658 |
| 2007/0103943 A1* | 5/2007 | Mangtani | H02M 3/33507 |
| | | | 363/20 |
| 2008/0061800 A1* | 3/2008 | Reynolds | G01R 27/2605 |
| | | | 324/678 |
| 2008/0116904 A1* | 5/2008 | Reynolds | G06F 3/0416 |
| | | | 324/678 |
| 2009/0224776 A1 | 9/2009 | Keith | |
| 2010/0139991 A1 | 6/2010 | Philipp et al. | |
| 2010/0188356 A1* | 7/2010 | Vu | G06F 3/03545 |
| | | | 345/173 |
| 2010/0283485 A1 | 11/2010 | Valisuo et al. | |
| 2011/0063229 A1* | 3/2011 | Krah | G06F 3/0418 |
| | | | 345/173 |
| 2011/0134076 A1* | 6/2011 | Kida | G06F 3/0412 |
| | | | 345/174 |
| 2012/0256869 A1* | 10/2012 | Walsh | G06F 3/0416 |
| | | | 345/174 |
| 2012/0287077 A1* | 11/2012 | Pant | G06F 3/044 |
| | | | 345/174 |
| 2012/0306801 A1* | 12/2012 | Rai | G06F 3/044 |
| | | | 345/174 |
| 2014/0062937 A1* | 3/2014 | Schwartz | G06F 3/0418 |
| | | | 345/174 |
| 2014/0225856 A1* | 8/2014 | Shepelev | G06F 3/0418 |
| | | | 345/174 |
| 2014/0267071 A1* | 9/2014 | Shahparnia | G06F 3/03545 |
| | | | 345/173 |
| 2015/0035794 A1* | 2/2015 | Zhitomirskiy | G06F 3/044 |
| | | | 345/174 |
| 2015/0130731 A1* | 5/2015 | Chang | G06F 3/0416 |
| | | | 345/173 |
| 2015/0145535 A1* | 5/2015 | Nys | G06F 3/0418 |
| | | | 324/679 |
| 2015/0212643 A1* | 7/2015 | Lee | G06F 3/0416 |
| | | | 345/174 |
| 2016/0034094 A1* | 2/2016 | Kang | G06F 3/0416 |
| | | | 345/173 |
| 2016/0124601 A1* | 5/2016 | Hsiao | G06F 3/0416 |
| | | | 345/173 |
| 2016/0202839 A1* | 7/2016 | Hwang | G06F 3/0416 |
| | | | 345/174 |
| 2016/0274694 A1* | 9/2016 | King | G06F 3/044 |
| 2017/0176225 A1* | 6/2017 | Fontes | G01D 5/24 |

* cited by examiner

CAPACITIVE SENSING DEVICE WITH SINGLE REFERENCE CHANNEL

BACKGROUND

Field of the Disclosure

Embodiments of disclosure generally relate to proximity sensing devices and, more particularly, to a capacitive sensing device with a single reference channel.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

SUMMARY

Techniques for providing a capacitive sensing device with a single reference channel are provided. In an embodiment, a processing system for a capacitive sensing device includes a reference transmitter coupled to a reference capacitance. The processing system further includes a charge accumulation circuit having an input coupled to the reference transmitter through the reference capacitance and configured to generate an integrated signal. The processing system further includes a demodulator circuit having an input coupled to an output of the charge accumulation circuit and configured to demodulate the integrated signal to generate at least one demodulated signal. The processing system further includes a sampling circuit having an input coupled to an output of the demodulator circuit and configured to sample the at least one demodulated signal. The processing system further includes a first reference buffer coupled to an output of the sampling circuit, the first reference buffer outputting a first voltage reference for the capacitive sensing device. The processing system further includes a second reference buffer coupled to the output of the sampling circuit, the second reference buffer outputting a second voltage reference for the capacitive sensing device.

In another embodiment, an input device includes a plurality of sensor electrodes, and a processing system, coupled to the plurality of sensor electrodes, including a plurality of sensor channels coupled to the plurality of sensor electrodes and a single reference channel coupled to a reference transmitter through a reference capacitance. The reference channel includes a charge accumulation circuit having an input coupled to the reference transmitter through the reference capacitance and configured to generate an integrated signal. The reference channel further includes a demodulator circuit having an input coupled to an output of the charge accumulation circuit and configured to demodulate the integrated signal to generate at least one demodulated signal. The reference channel further includes a sampling circuit having an input coupled to an output of the demodulator circuit and configured to sample the at least one demodulated signal. The reference channel further includes a first reference buffer coupled to an output of the sampling circuit, the first reference buffer outputting a first voltage reference for the capacitive sensing device. The reference channel further includes a second reference buffer coupled to the output of the sampling circuit, the second reference buffer outputting a second voltage reference for the capacitive sensing device.

In another embodiment, a method of generating reference voltages for a capacitive sensing device includes coupling a transmitter signal to a reference capacitance. The method further includes integrating output of the reference capacitance to generate an integrated signal. The method further includes demodulating the integrated signal to generate at least one demodulated signal. The method further includes sampling the at least one demodulated signal. The method further includes buffering the sampled at least one demodulated signal to output a first voltage reference and a second voltage reference.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

Figure 1:
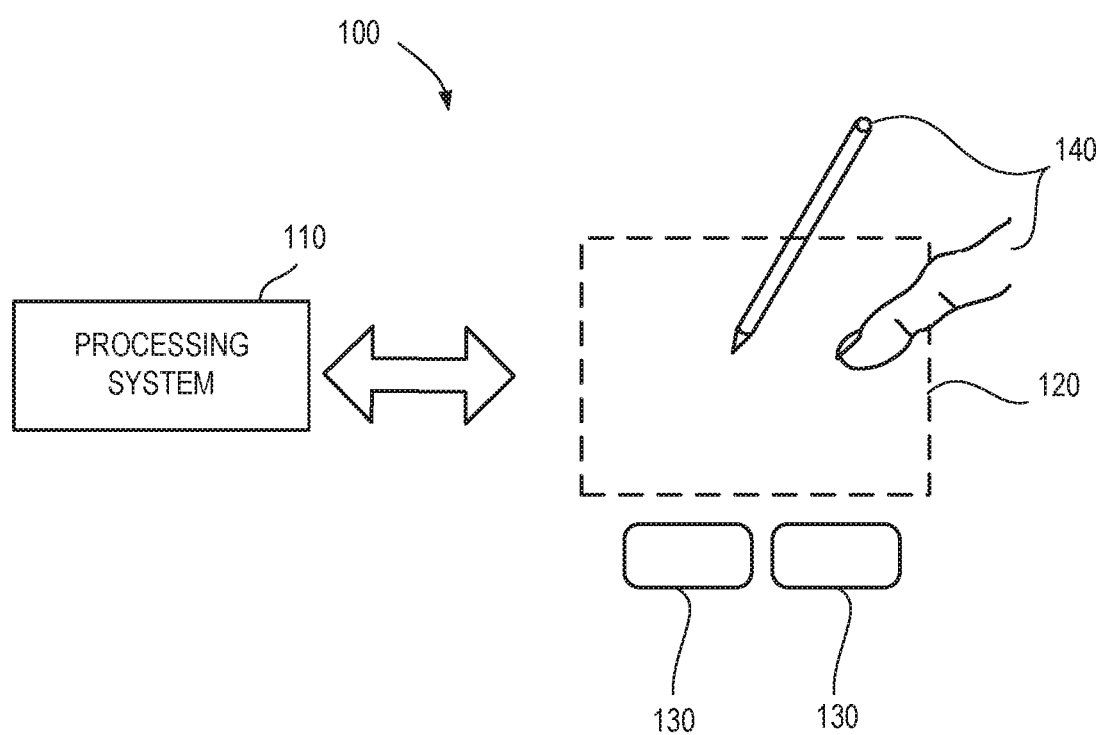
FIG. 1 is a block diagram of an exemplary input device, according to one embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

FIG. 1 is a block diagram of an exemplary input device 100, in accordance with embodiments of the invention. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
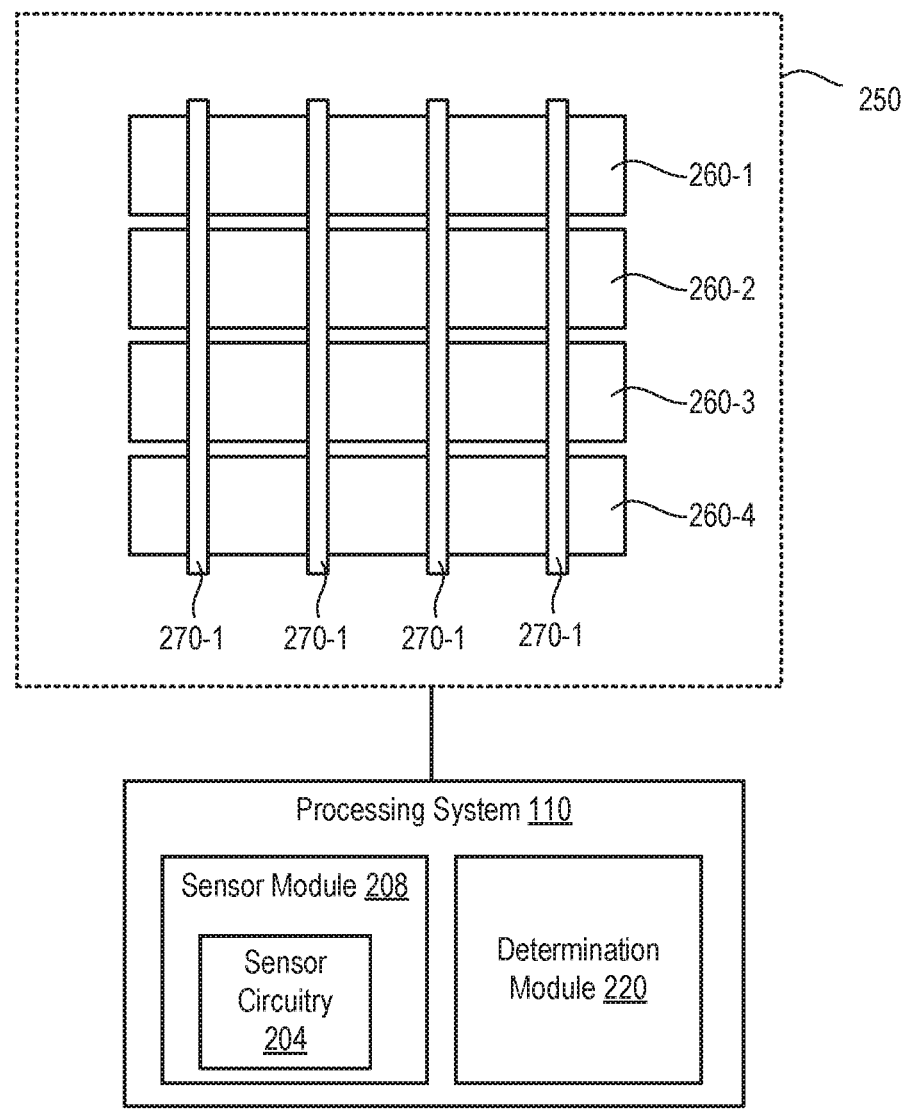
FIG. 2 illustrates a portion of an exemplary pattern of sensing elements according to some embodiments.

FIG. 2 illustrates a portion of an exemplary pattern of sensing elements according to some embodiments. For clarity of illustration and description, FIG. 2 shows the sensing elements in a pattern of simple rectangles and does not show various components, such as various interconnects between the sensing elements and the processing system 110. An electrode pattern 250 comprises a first plurality of sensor electrodes 260 (260-1, 260-2, 260-3, ... 260-$n$), and a second plurality of sensor electrodes 270 (270-1, 270-2,

270-3, . . . 270-m) disposed over the first plurality of electrodes 260. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. Further processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250 can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may be form "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each of the first plurality of sensor electrodes 260 and the second plurality of sensor electrodes 270 and an input object may be termed "capacitive measurements" of "capacitive profiles."

The processing system 110 can include a sensor module 208 comprising sensor circuitry 204. The sensor module 208 operates the electrode pattern 250 to receive resulting signals from electrodes in the electrode pattern using a capacitive sensing signal having a sensing frequency. The resulting signals measure capacitive couplings (e.g., absolute capacitive couplings between sensor electrodes and an input object or transcapacitive couplings between sensor electrodes). The resulting signals indicate changes in capacitance as a result of input object(s). The sensor circuitry 204 can include various circuits and circuit elements, such as switches, amplifiers, mixers, filters, down-converters, demodulators, analog-to-digital converters, and the like to receive the resulting signals.

The processing system 110 can include a determination module 220 configured to receive resulting signals from the sensor module 208, process the resulting signals, and generate data from the resulting signals, such as determining capacitive sensing data (also referred to as capacitive measurements) from the resulting signals (e.g., a capacitive image or capacitive profile). The determination module 220 can track changes in capacitive sensing to detect input object(s) in the sensing region 120. The determination module 220 can include processor circuitry 221, such as a digital signal processor (DSP), microprocessor, microcontroller, or the like. The processor circuitry 221 can execute firmware and/or software to perform the various functions of the determination module 220 described herein.

The processing system 110 can include other modular configurations, and the functions performed by the sensor module 208 and the determination module 220 can, in general, be performed by one or more modules in the processing system 110. The processing system 110 can include other modules, and can perform other functions as described in some embodiments below.

The processing system 110 can operate in absolute capacitive sensing mode or transcapacitive sensing mode. In absolute capacitive sensing mode, the sensor module 208 provides resulting signals measuring absolute capacitive couplings between sensor electrodes and input object(s) (e.g., changes in absolute capacitance due to input object(s)). In transcapacitive sensing mode, the sensor module 208 provides resulting signals measuring transcapacitive couplings between sensor electrodes (e.g., changes in mutual capacitance between sensor electrodes due to input object(s)).

In some embodiments, the processing system 110 "scans" the electrode pattern 250 to determine capacitive couplings. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receiving resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The determination module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (OLED), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass).

In an embodiment, the processing system 110 comprises a single integrated controller, such as an application specific integrated circuit (ASIC), having the sensor module 208, the determination module 220, and any other module(s) and/or circuit(s). In another embodiment, the processing system 110 can include a plurality of integrated circuits, where the sensor module 208, the determination module 220, and any other module(s) and/or circuit(s) can be divided among the integrated circuits. For example, the sensor module 208 can be on one integrated circuit, and the determination module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

Figure 3:
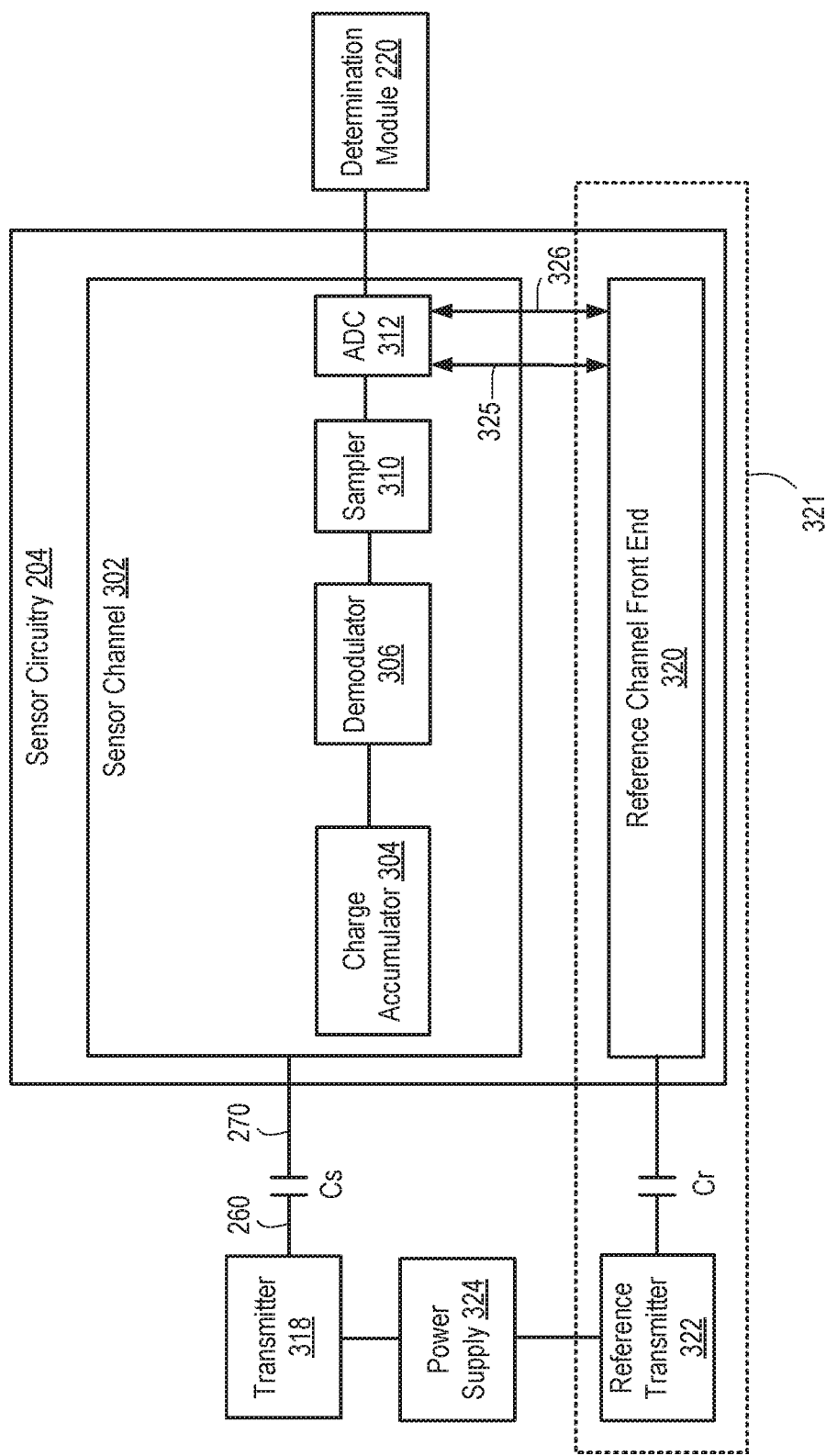
FIG. 3 is a block diagram depicting a more detailed view of sensor circuitry according to an embodiment.

FIG. 3 is a block diagram depicting a more detailed view of the sensor circuitry 204 according to an embodiment. The sensor circuitry 204 includes a sensor channel 302 and a reference channel front end 320. For purposes of clarity by example, only a single sensor channel 302 is shown. In general, sensor circuitry 204 can include a plurality of sensor channels each configured similarly as the sensor channel 302. In embodiments described herein, the sensor circuitry 204 includes a single reference channel front end 320 that provides reference voltages for use by the sensor channel 302 or any other circuits or modules in processing system 110 (e.g., the determination module 220). The single reference channel front end 320 shares circuitry in order to reduce area, reduce power consumption, and mitigate noise.

The sensor channel 302 is coupled to a sensor electrode, such as a receiver electrode 270. FIG. 3 shows an example of transcapacitive sensing, where a transmitter 318 is coupled to a transmitter electrode 260. The transmitter electrode 260 is capacitively coupled to the receiver electrode 270, which is represented by a capacitance Cs. Transmitter 318 can include a signal generator, driver, or the like configured to drive a transmitter signal on a sensor electrode. The transmitter signal can be a square, sine, rectangular, trapezoidal, Gaussian or other shaped waveform. In general, the transmitter signal is a signal oscillating between a first voltage (e.g., a reference voltage, such as VCOM) and a second voltage (e.g., a supply voltage $V_{TX}$). In an embodiment, the transmitter signal includes periodic pulses that transition from the first voltage to the second voltage and back to the first voltage. Transmitter 318 receives a supply voltage (e.g., $V_{TX}$) from a power supply 324. The transmitter 318 can be part of the sensor module 208 or another module within the processing system 110. Alternatively, the transmitter 318 can be external to the processing system 110 (e.g., in another IC).

The reference channel front end 320 is coupled to a reference transmitter 322 through a capacitor Cr. The reference transmitter 322, the capacitor Cr, and the reference channel front end 320 comprise a reference channel 321. The capacitor Cr can include one or more capacitors in varies series and/or parallel combinations. The capacitor Cr can also be variable and controllable by the processing system 110. For example, the capacitor Cr can include a varactor or switchable banks of capacitances configured to provide a variable capacitance. The reference transmitter 322 can include a single generator, driver, or the like configured to generate a transmitter signal. The transmitter signal can be configured similarity as the transmitter signal generated by the transmitter 318. The reference transmitter 322 receives the supply voltage from the power supply 324. The transmitter signal generated by the reference transmitter 322 is capacitively coupled to the reference channel front end 320 through the capacitor Cr. The capacitor Cr can be part of the sensor circuitry 204, part of the sensor module 208 (external to the sensor circuitry 204), or part of the processing system 110 (external to the sensor module 208). The reference transmitter 322 can be part of the sensor module 208 or another module within the processing system 110. Alternatively, the reference transmitter 322 can be external to the processing system 110 (e.g., in another IC). In another embodiment, the capacitor Cr is not driven with a transmitter signal from the reference transmitter 322. For example, the reference transmitter 322 can output a particular DC voltage (e.g., VDD or GND) as output rather than a transmitter signal.

In an embodiment, the sensor channel 302 includes a charge accumulator 304, a demodulator 306, a sampler 310, and an analog-to-digital converter (ADC) 312. In an embodiment, the charge accumulator 304 comprises a charge integrator circuit. In another embodiment, the charge accumulator 304 can be include a current conveyer circuit followed by a charge integrator circuit. In general, the charge accumulator 304 is configured to accumulate charge stored by the capacitance Cs between sensor electrodes 260 and 270. In another embodiment, a current conveyer can be coupled between the sensor electrode 270 and the charge accumulator 304. The additional current conveyer can be used to attenuate the input current by a programmable factor before integration by the charge accumulator 304.

In other embodiments, the sensor channel 302 can have a different architecture than that shown in FIG. 3. For example, another implementation includes a charge accumulator coupled directly to an ADC, where demodulation, filtering, etc. are performed in the digital domain rather than in the analog domain. Thus, the embodiments described herein are not limited to any particular architecture of the sensor channel 302.

The sensor switch 332 controls whether the sensor electrode 270 is coupled to an inverting input of the operational amplifier 334. In transcapacitive sensing (shown in FIG. 3), a reference voltage is coupled to a non-inverting input of the operational amplifier 334. In absolute sensing, time-varying voltage signal can be coupled to the non-inverting input of the operational amplifier 334. When the sensor switch 332 is closed, the operational amplifier 334 integrates a resulting signal on the sensor electrode 270. The resulting signal can include the transmitter signal modulated by the presence of one or more input objects in the sensing region. The feedback capacitance Cfb accumulates charge. The reset switch 328 can be closed to drain the accumulated charge from the feedback capacitance Cfb. The charge accumulator 304 can accumulate charge and then reset one or more times during a sensing cycle.

The demodulator 306 removes the effects of the transmitter signal from the resulting signal. The demodulator 306 can include demodulation circuits (e.g., envelope detector, product detector, and the like), filter circuits (e.g., low-pass filter), amplifier circuits, and the like. The sampler 310 receives the demodulated signal from the demodulator 306. The sampler 310 samples the demodulated signal over a plurality of sensing cycles referred to as an "acquisition burst" or "capacitive sensing burst". The ADC 312 generates digital samples from output of the sampler 310 for each acquisition burst, which are output to the determination module 260. The determination module 260 processes the digital samples for each capacitive sensing burst to derive information, such as capacitive measurements.

The reference channel front end 320 generates reference voltages 325 and 326 for use by the ADC 312 in each sensor channel 302. In an embodiment, the reference voltages 325 and 326 comprise high and low reference voltages that establish a range for the ADC 312. The reference channel front end 320 is part of a pseudo-differential architecture with the sensor channel 302 and operates to cancel out the common non-idealities and improve the power supply rejection ratio (PSRR) of the ADC measurements of the sensor channels 302. In embodiments (discussed below), the reference channel front end 320 comprises a common architecture for generating both of the reference voltages 325 and 326. The single reference channel architecture shares circuits to significantly reduce area, power consumption, and noise with respect to architectures that employ two reference channels.

Figure 4:
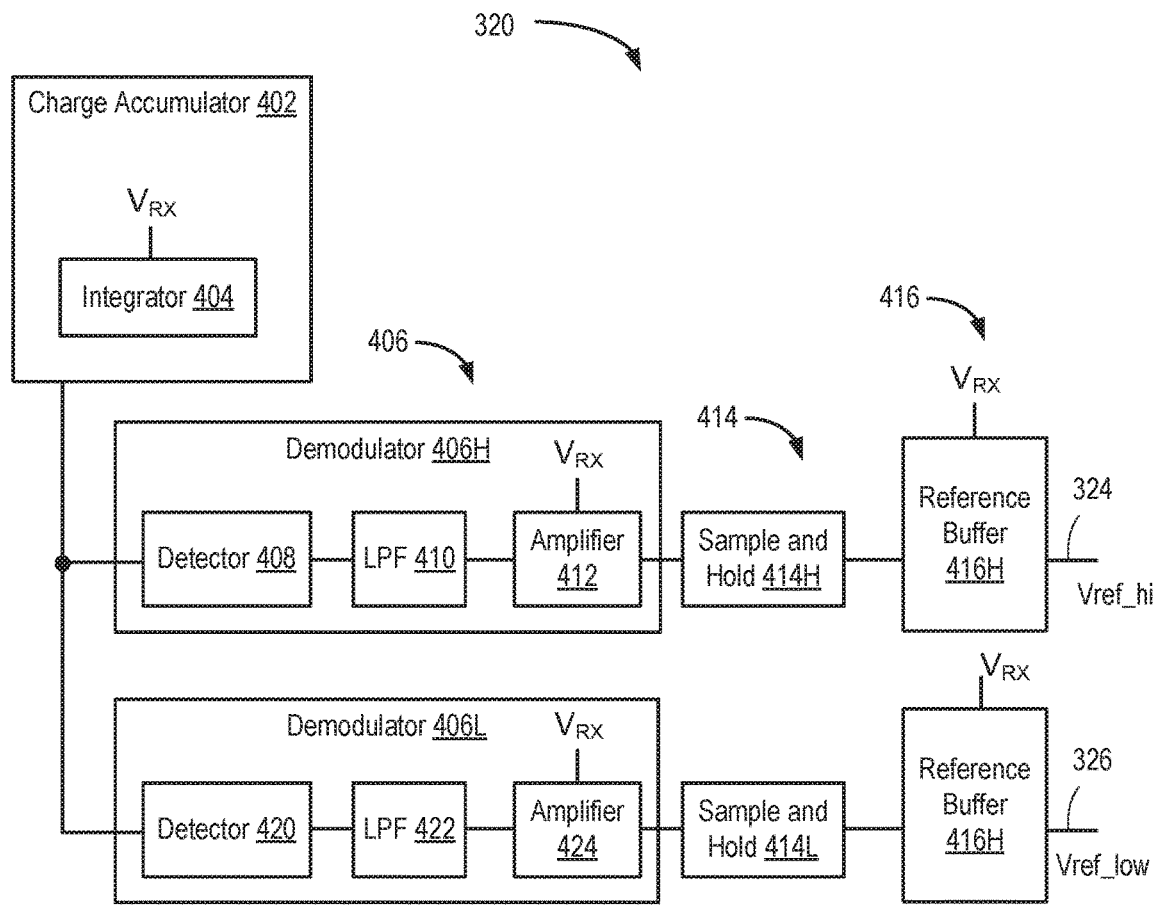
FIG. 4 is a block diagram depicting an embodiment of a reference channel.

FIG. 4 is a block diagram depicting an embodiment of the reference channel front end 320. In the embodiment, the reference channel front end 320 includes a charge accumulator 402, a demodulator circuit 406, a sampling circuit 414, and a reference buffer circuit 416. The demodulator circuit 406 comprises a first demodulator 406H and a second demodulator 406L. The sampling circuit 414 comprises a first sample-and-hold circuit 414H and a second sample-and-hold circuit 414L. The reference buffer circuit 416 comprises a first reference buffer 416H and a second reference buffer 416L. The reference buffers 416H and 416L can be voltage follower circuits or the like.

The charge accumulator 402 is coupled to each of the demodulators 406H and 406L. In an embodiment, the charge accumulator 402 includes an integrator 404 configured similarly to the integrator in the charge accumulator 304 described above. Alternatively, the charge accumulator 402 can include other types of circuits configured to accumulate charge, such as a current conveyer. The charge accumulator 402 is coupled to the capacitor Cr described above.

The demodulator 406H is coupled to the sample-and-hold circuit 414H, which is coupled to the reference buffer 416H. The demodulator 406L is coupled to sample-and-hold circuit 414L, which is coupled to the reference buffer 416L. The reference buffer 416H outputs the reference voltage 324 referred to as "Vref_hi". The reference buffer 416L outputs the reference voltage 326 referred to as "Vref_low". The reference voltages 324 and 326 are used by the ADC 312 in each sensor channel 304 to establish its range.

In an embodiment, the demodulator 406H includes a detector circuit ("detector 406"), a low-pass filter (LPF) circuit ("LPF 410"), and an amplifier circuit ("amplifier 412"). The detector 406 is coupled between the charge accumulator 402 and the LPF 410. The LPF 410 is coupled between the detector 406 and the amplifier 412. The amplifier 412 is coupled between the LPF 410 and the sample-and-hold circuit 414H. The sample-and-hold circuit 414H is coupled between the amplifier 412 and the reference buffer 416H. Similarly, in an embodiment, the demodulator 406L includes a detector circuit ("detector 420"), a low-pass filter (LPF) circuit ("LPF 422"), and an amplifier circuit ("amplifier 424"). The detector 420 is coupled between the charge accumulator 402 and the LPF 422. The LPF 422 is coupled between the detector 420 and the amplifier 424. The amplifier 424 is coupled between the LPF 422 and the sample-and-hold circuit 414L. The sample-and-hold circuit 414L is coupled between the amplifier 424 and the reference buffer 416L.

In operation, the charge accumulator 402 integrates the capacitively-coupled transmitter signal from the reference transmitter 322. The charge accumulator 402 includes a supply voltage referred to as $V_{RX}$. The maximum voltage of the integrated signal is thus $V_{RX}$ (saturation voltage). Each demodulator 406H and 406L receives the integrated signal output from the charge accumulator 402. The demodulator 406H demodulates the integrated signal to generate a demodulated signal (referred to as $V_{demod\_out\_hi}$). In particular, the detector 408 removes the effects of the transmitter signal (e.g., removes the carrier) to generate a baseband signal. The detector 408 can include an envelope detector, product detector, or the like. The low-pass filter 410 removes high-frequency components of the baseband signal (e.g., noise). The amplifier 412 amplifies the baseband signal to provide the demodulated signal. The supply voltage of the amplifier 412 is $V_{RX}$. The maximum voltage of the demodulated signal is thus $V_{RX}$ (saturation voltage). The amplifier 412 can include any gain, including unity gain (e.g., current amplification).

The demodulator 406L demodulates the integrated signal to generate a demodulated signal (referred to as $V_{demod\_out\_low}$). The demodulator 406L operates with an opposite polarity than the demodulator 406H such that $V_{demod\_out\_low}=V_{RX}-V_{demod\_out\_high}$. In particular, the detector 420 removes the effects of the transmitter signal (e.g., removes the carrier) to generate a baseband signal. The detector 420 generates a baseband signal having the opposite polarity as the baseband signal generted by the detector 408. The detector 420 can include an envelope detector, product detector, or the like. The low-pass filter 422 removes high-frequency components of the baseband signal (e.g., noise). The amplifier 424 amplifies the baseband signal to provide the demodulated signal. The supply voltage of the amplifier 424 is $V_{RX}$. The maximum voltage of the demodulated signal is thus $V_{RX}$ (saturation voltage). The amplifier 424 can include any gain, including unity gain (e.g., current amplification).

The sample-and-hold circuit 414H samples the demodulated signal from the demodulator 406H, and the sample-and-hold circuit 414L samples the demodulated signal from the demodulator 406L. The reference buffer 416H buffers the output of the sample-and-hold 414H, and the reference buffer 416L buffers the output of the sample-and-hold 414L. Each of the reference buffers 416H and 416L include a supply voltage of $V_{RX}$. The reference buffer 416H outputs a reference voltage referred to as $V_{ref\_hi}$, and the reference buffer 416L outputs a reference voltage referred to as $V_{ref\_low}$. The voltage references 324 and 326 are symmetric around $V_{RX}/2$ such that $V_{ref\_low}=V_{RX}-V_{ref\_hi}$.

The reference channel front end 320 outputs reference voltages 324 and 326 that track noise common to the reference channel front end 320 and the sensor channels 302, such as noise on the power supply 324 and noise introduced by circuit components (e.g., charge accumulator, demodulator, sample-and-hold, etc.). In the embodiment shown in FIG. 4, the demodulators 406H and 406L share the charge accumulator 402. Thus, a single reference channel is provided that includes a single charge accumulator, reducing area and power consumption. Further, reducing the number of charge accumulator blocks reduces the number of noise contributors.

Figure 5:
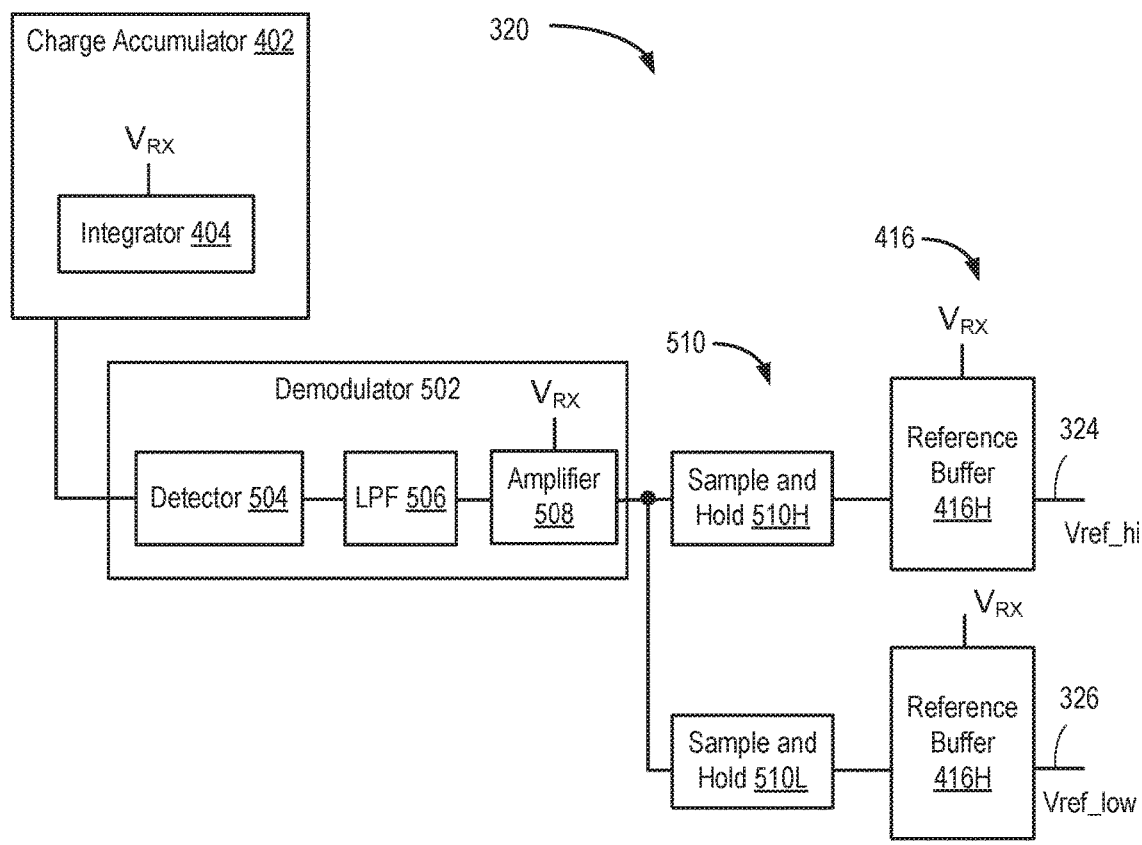
FIG. 5 is a block diagram depicting another embodiment of a reference channel.

FIG. 5 is a block diagram depicting another embodiment of the reference channel front end 320. Elements in FIG. 5 that are the same or similar to those of FIG. 4 are designated with identical reference numerals and are described above. In the present embodiment, the high and low reference channels share both a charge accumulator and a demodulator. The reference channel front end 320 includes the charge accumulator 402, a demodulator 502, a sampling circuit 510, and the reference buffer circuit 416.

In particular, the output of the charge accumulator 402 is coupled to the demodulator 502. An output of the demodulator 502 is coupled to each of a sample-and-hold circuit 510H and a sample-and-hold circuit 510L. An output of the sample-and-hold circuit 510H is coupled to the reference buffer 416H, and an output of the sample-and-hold circuit 510L is coupled to the reference buffer 416L.

The demodulator 502 includes a detector 504, a low-pass filter 506, and an amplifier 508. An input of the detector 504 is coupled to an output of the charge accumulator 402. The low-pass filter 506 is coupled between the detector 504 and the amplifier 508. The amplifier 508 is coupled between the low-pass filter 506 and the sample-and-hold circuits 510H and 510L.

The demodulator 502 demodulates the integrated signal to generate a demodulated signal (referred to as $V_{demod\_out}$). In particular, the detector 504 removes the effects of the transmitter signal (e.g., removes the carrier) to generate a baseband signal. The detector 504 can include an envelope detector, product detector, or the like. The low-pass filter 506 removes high-frequency components of the baseband signal (e.g., noise). The amplifier 508 amplifies the baseband signal to provide the demodulated signal. The supply voltage of the amplifier 508 is $V_{RX}$. The maximum voltage of the demodulated signal is thus $V_{RX}$ (saturation voltage). The amplifier 508 can include any gain, including unity gain (e.g., current amplification).

The sample-and-hold circuit 510H samples the demodulated signal from the demodulator 502, and the sample-and-hold circuit 510L samples the demodulated signal from the demodulator 502. The sample-and-hold circuit 510L outputs a signal having the opposite polarity as the signal output from the sample-and-hold circuit 510H. The reference buffer 416H buffers the output of the sample-and-hold circuit 510H, and the reference buffer 416L buffers the output of the sample-and-hold circuit 510L. Each of the reference buffers 416H and 416L include a supply voltage of $V_{RX}$. The reference buffer 416H outputs a reference voltage referred to as $V_{ref\_hi}$, and the reference buffer 416L outputs a reference voltage referred to as $V_{ref\_low}$. The voltage references 324 and 326 are symmetric around $V_{RX}/2$ such that $V_{ref\_low}=V_{RX}-V_{ref\_hi}$.

The reference channel front end 320 outputs reference voltages 324 and 326 that track noise common to the reference channel front end 320 and the sensor channels 302, such as noise on the power supply 324 and noise introduced by circuit components (e.g., charge accumulator, demodulator, sample-and-hold, etc.). In the embodiment shown in FIG. 5, both the charge accumulator 402 and the demodulator 502 are shared. Thus, a single reference channel is provided that includes a single charge accumulator and a single demodulator, further reducing area and power consumption. Further, reducing the number of charge accumulator and demodulator blocks further reduces the number of noise contributors.

Figure 6:
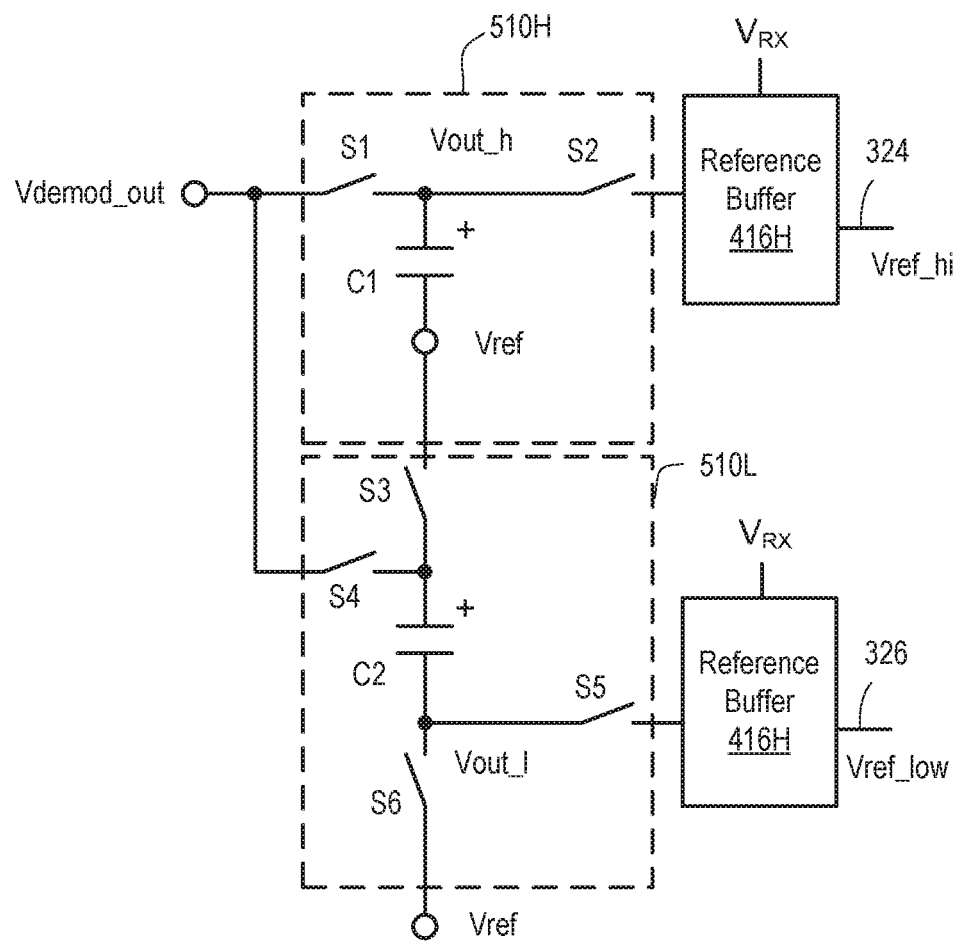
FIG. 6 is a schematic diagram depicting an embodiment of a sampling circuit for a reference channel.

FIG. 6 is a schematic diagram depicting an embodiment of the sampling circuit 510. An input of the sampling circuit 510 receives a demodulated signal from the demodulator 502 ($V_{demod\_out}$). The demodulated signal is coupled to each of the sample-and-hold circuit 510H and the sample-and-hold circuit 510L. The sample-and-hold circuit 510H includes switches S1 and S2 and a capacitor C1. The sample-and-hold circuit 510L includes switches S3, S4, S5, and S6 and a capacitor C2. The switches S1-S6 can include transistors or the like.

The capacitor C1 is coupled between a node Vout_h and a node Vref. Notably, the capacitor C1 has a polarity such that a positive plate of the capacitor C1 is coupled to the node Vout_h and a negative plate of the capacitor C1 is coupled to the node Vref. The switch S1 is coupled between the node $V_{demod\_out}$ and the node Vout_h. The switch S2 is coupled between the node Vout_h and the reference buffer 416H. The voltage $V_{ref\_hi}$ is equal to Vout_h.

The capacitor C2 has a polarity such that a positive plate is coupled to the node Vref through the switch S3 and a negative plate is coupled to a node Vout_l. The switch S4 is coupled between the node $V_{demod\_out}$ and the positive plate of the capacitor C2. The switch S6 is coupled between the node Vref and the negative plate of the capacitor C2. The switch S5 is coupled between the negative plate of the capacitor C2 and the reference buffer 416H. The voltage $V_{ref\_low}$ is equal to Vout_l.

In operation, in a sample phase, the switches S1, S4, and S6 are closed and the switches S2, S3, and S5 are open. The voltage across each capacitor C1 and C2 is equal to $V_{demod\_out}$–Vref. In an embodiment, each capacitor C1 and C2 has the same capacitance ($C_{SH}$) and thus each capacitor C1 and C2 stores the same charge during the sample phase, i.e., $Q=C_{SH}*(V_{demod\_out}-Vref)$. In a hold phase, the switches S1, S4, and S6 are open and the switches S2, S3, and S5 are closed. The voltage Vout_h is equal to $Q/C_{SH}$+Vref, which equals $V_{demod\_out}$. The voltage Vout_l is equal to Vref–$Q/C_{SH}$, which equals 2*Vref–$V_{demod\_out}$. If Vref is set equal to $V_{RX}/2$, then Vout_l is equal to $V_{RX}$–Vout_h. Thus, the range $V_{ref\_hi}$–$V_{ref\_low}$ is centered about $V_{RX}/2$. Since both capacitors C1 and C2 are always connected to Vref, this scheme is immune to noise coupling into each reference channel from different power supplies. Furthermore, any noise within the input voltage, $V_{demod\_out}$, will be reversed and subtracted out in the ADC measurements.

Figure 7:
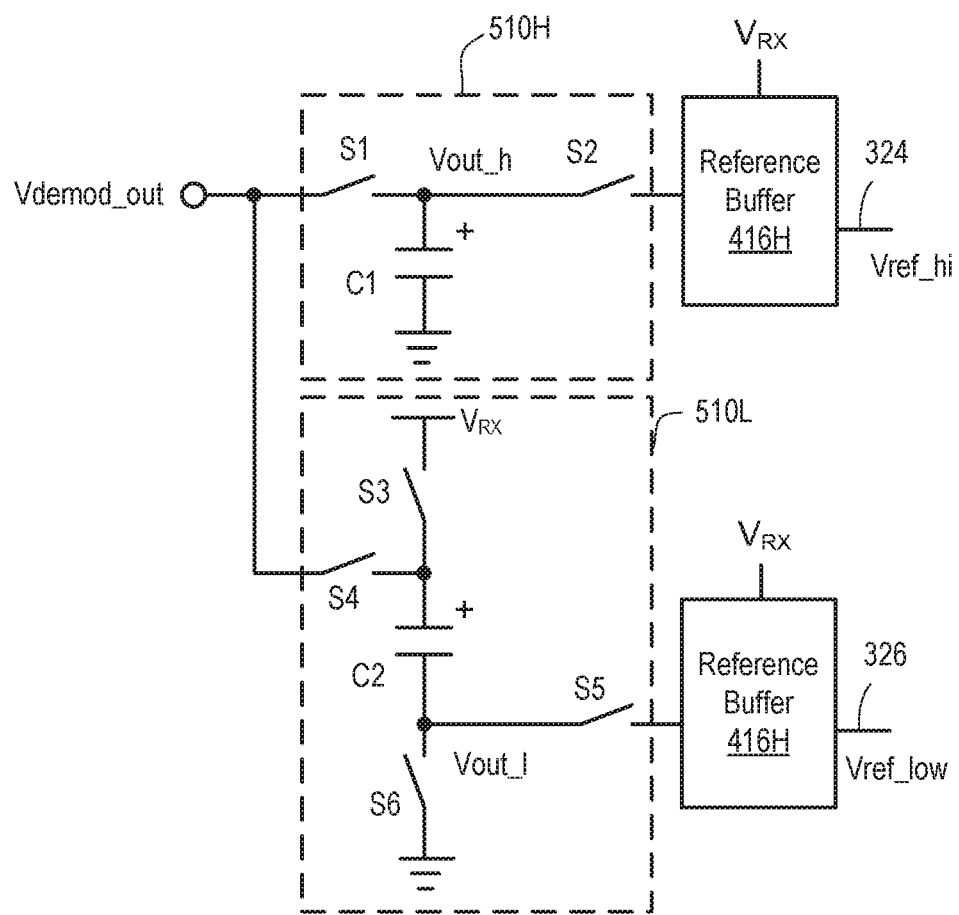
FIG. 7 is a schematic diagram depicting another embodiment of a sampling circuit for a reference channel.

FIG. 7 is a schematic diagram depicting another embodiment of the sampling circuit 510. An input of the sampling circuit 510 receives a demodulated signal from the demodulator 502 ($V_{demod\_out}$). The demodulated signal is coupled to each of the sample-and-hold circuit 510H and the sample-and-hold circuit 510L. The sample-and-hold circuit 510H includes switches S1 and S2 and a capacitor C1. The sample-and-hold circuit 510L includes switches S3, S4, S5, and S6 and a capacitor C2. The switches S1-S6 can include transistors or the like.

The capacitor C1 is coupled between a node Vout_h and electrical ground. Notably, the capacitor C1 has a polarity such that a positive plate of the capacitor C1 is coupled to the node Vout_h and a negative plate of the capacitor C1 is coupled to electrical ground. The switch S1 is coupled between the node $V_{demod\_out}$ and the node Vout_h. The switch S2 is coupled between the node Vout_h and the reference buffer 416H. The voltage $V_{ref\_hi}$ is equal to Vout_h.

The capacitor C2 has a polarity such that a positive plate is coupled to the node $V_{RX}$ through the switch S3 and a negative plate is coupled to a node Vout_l. The switch S4 is coupled between the node $V_{demod\_out}$ and the positive plate of the capacitor C2. The switch S6 is coupled between electrical ground and the negative plate of the capacitor C2. The switch S5 is coupled between the negative plate of the capacitor C2 and the reference buffer 416H. The voltage $V_{ref\_low}$ is equal to Vout_l.

In operation, in a sample phase, the switches S1, S4, and S6 are closed and the switches S2, S3, and S5 are open. The voltage across each capacitor C1 and C2 is equal to $V_{demod\_out}$. In an embodiment, each capacitor C1 and C2 has the same capacitance ($C_{SH}$) and thus each capacitor C1 and C2 stores the same charge during the sample phase, i.e., $Q=C_{SH}*V_{demod\_out}$. In a hold phase, the switches S1, S4, and S6 are open and the switches S2, S3, and S5 are closed. The voltage Vout_h is equal to $Q/C_{SH}$, which equals $V_{demod\_out}$. The voltage Vout_l is equal to $V_{RX}$–$Q/C_{SH}$, which equals $V_{RX}$–$V_{demod\_out}$. Thus, the range $V_{ref\_hi}$–$V_{ref\_low}$ is centered about $V_{RX}/2$. In the present embodiment, an intermediate voltage (Vref) is not required.

Figure 8:
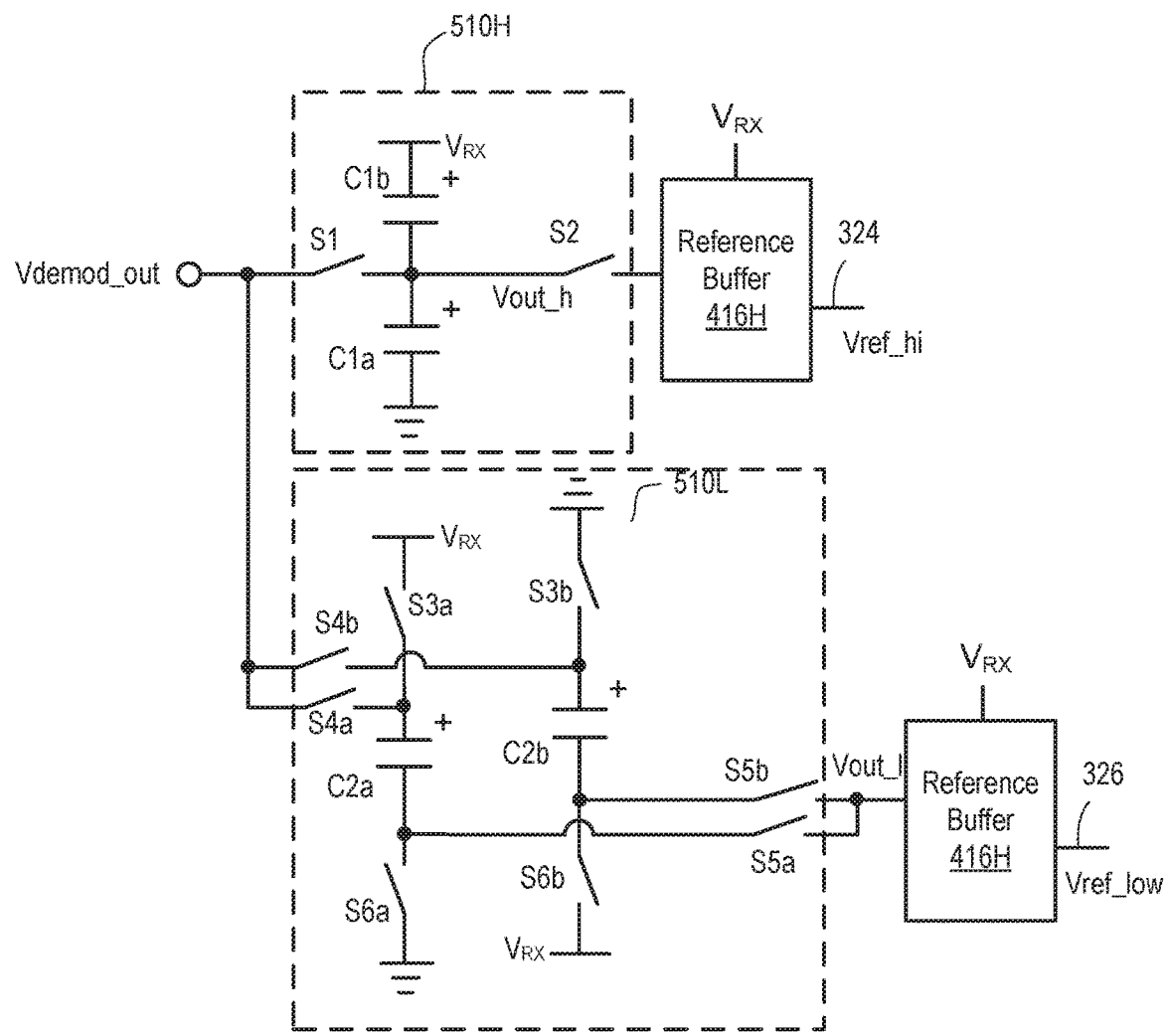
FIG. 8 is a schematic diagram depicting yet another embodiment of a sampling circuit for a reference channel

FIG. 8 is a schematic diagram depicting another embodiment of the sampling circuit 510. An input of the sampling circuit 510 receives a demodulated signal from the demodulator 502 ($V_{demod\_out}$). The demodulated signal is coupled to each of the sample-and-hold circuit 510H and the sample-and-hold circuit 510L. The sample-and-hold circuit 510H includes switches S1 and S2 and a capacitors C1a and C1b. The sample-and-hold circuit 510L includes switches S3a, S3b, S4a, S4b, S5a, S5b, S6a, and S6b, as well as capacitors C2a and C2b. The switches S1a-S6a and S1b-S6b can include transistors or the like.

The capacitor C1a is coupled between a node Vout_h and electrical ground. Notably, the capacitor C1a has a polarity such that a positive plate of the capacitor C1a is coupled to the node Vout_h and a negative plate of the capacitor C1a is coupled to electrical ground. The capacitor C1b is coupled between a node Vout_h and the node $V_{RX}$. The capacitor C1b has a polarity such that a positive plate of the capacitor C1b is coupled to the node Vout_h and a negative plate of the capacitor C1b is coupled to node $V_{RX}$. The switch S1 is coupled between the node $V_{demod\_out}$ and the node Vout_h. The switch S2 is coupled between the node Vout_h and the reference buffer 416H. The voltage $V_{ref\_hi}$ is equal to Vout_h.

The capacitor C2a has a polarity such that a positive plate is coupled to the node $V_{RX}$ through the switch S3a and a negative plate is coupled to a node Vout_l through the switch S5a. The switch S4a is coupled between the node $V_{demod\_out}$ and the positive plate of the capacitor C2a. The switch S6a is coupled between electrical ground and the negative plate of the capacitor C2a. The switch S5a is coupled between the negative plate of the capacitor C2a and the reference buffer 416H.

The capacitor C2b has a polarity such that a positive plate is coupled to electrical ground through the switch S3b and a negative plate is coupled to the node Vout_1 through the switch S5b. The switch S4b is coupled between the node $V_{demod\_out}$ and the positive plate of the capacitor C2b. The switch S6b is coupled between the node $V_{RX}$ and the negative plate of the capacitor C2b. The switch S5b is coupled between the negative plate of the capacitor C2b and the reference buffer 416H.

In operation, in a sample phase, the switches S1, S4a, S4b, S6a, and S6b are closed and the switches S2, S3a, S3b, S5a, and S5b are open. In an embodiment, each capacitor C1a, C1b, C2a, and C2b has the same capacitance (½ $C_{SH}$). In a hold phase, the switches S1, S4a, S4b, S6a, and S6b are open and the switches S2, S3a, S3b, S5a, and S5b are closed. In the present embodiment, an intermediate voltage (Vfil-t_ref) is not required. In addition, splitting the capacitors C1 and C2 into two pairs of capacitors C1a/C1b and C2a/C2b and referencing them to both supplies ensures that both Vref_hi and Vref_low signal paths are exposed to the same supply noise.

In any of the embodiments of FIG. 6-8, the sampling circuit 510 can use different sampling techniques, such as bottom plate sampling or relative timing of switches to minimize charge injection errors.

Figure 9:
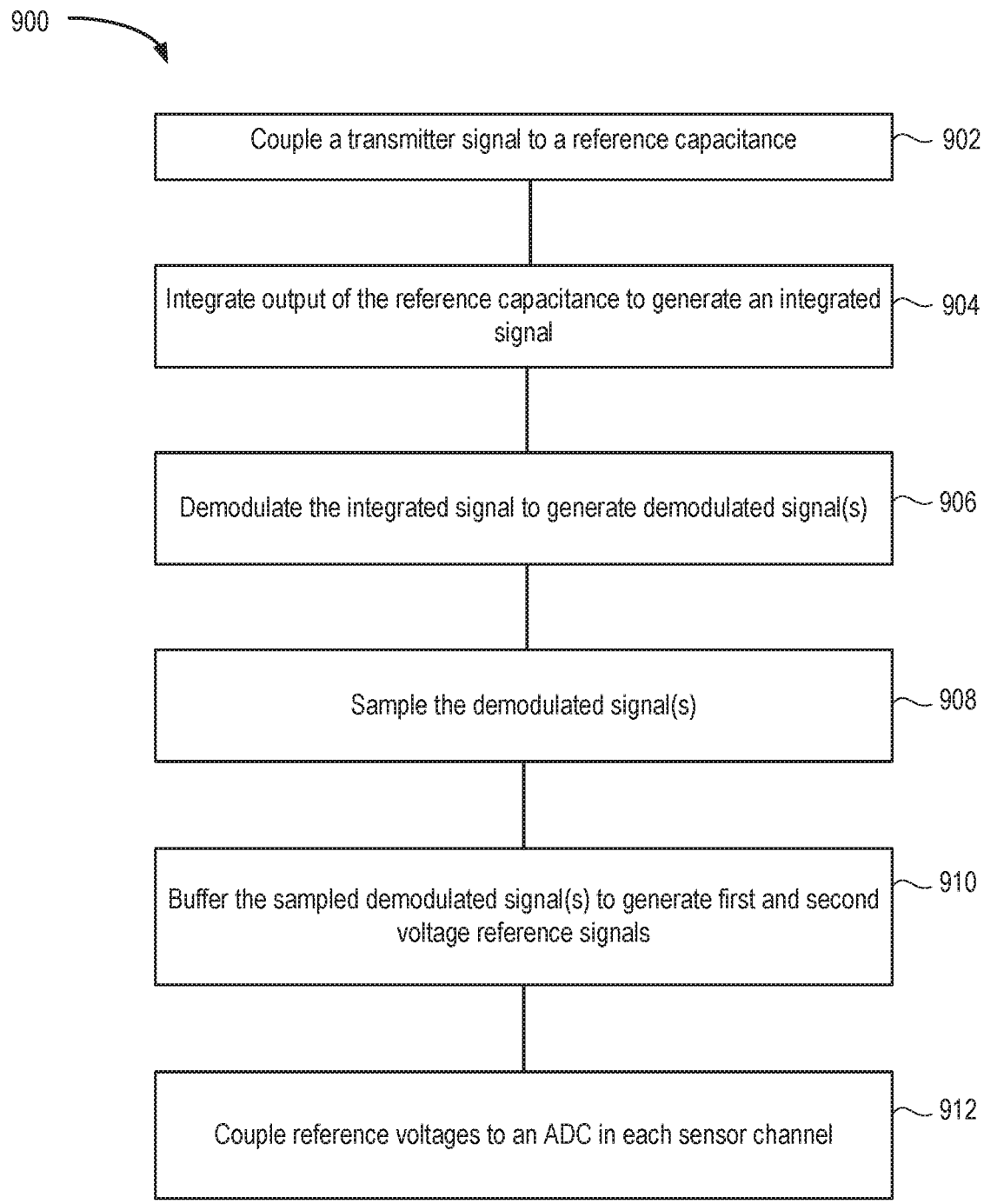
FIG. 9 is a method of generating reference voltages for a capacitive sensing device according to an embodiment.

FIG. 9 is a method 900 of generating reference voltages for a capacitive sensing device according to an embodiment. The method 900 begins at step 902, where a transmitter signal generated by the reference transmitter 322 is coupled to a reference capacitance Cr. At step 904, the charge accumulator 402 in the reference channel front end 320 integrates the output of the reference capacitance Cr to generate an integrated signal. At step 906, a demodulator circuit (406 or 502) demodulates the integrated signal to generate one or more demodulated signals. At step 908, a sampling circuit (414 or 410) samples the demodulated signal(s). At step 910, the reference buffer circuit 416 buffers the sampled demodulated signal(s) to generate first and second voltage reference signals. At step 912, the reference buffer circuit 416 couples the reference voltages to the ADC 312 in each sensor channel 302.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A processing system for a capacitive sensing device, comprising:
   a reference transmitter coupled to a reference channel front end through a reference capacitance, wherein the reference channel front end comprises;
   a charge accumulation circuit comprising a single integrator having an input coupled to the reference transmitter through the reference capacitance, wherein the integrator is configured to generate an integrated signal;
   a demodulator circuit having an input coupled to an output of the integrator and configured to demodulate the integrated signal to generate at least one of a first demodulated signal and a second demodulated signal;
   a sampling circuit comprising:
      a first sample-and-hold circuit comprising an input coupled to an output of the demodulator circuit and configured to sample the first demodulated signal; and
      a second sample-and-hold circuit comprising an input coupled to the output of the demodulator circuit and configured to sample the first demodulated signal or the second demodulated signal;
   a first reference buffer coupled to an output of the first sample-and-hold circuit, the first reference buffer configured to output a first voltage reference for the capacitive sensing device; and
   a second reference buffer coupled to an output of the second sample-and-hold circuit, the second reference buffer configured to output a second voltage reference for the capacitive sensing device, wherein the first voltage reference differs from the second voltage reference.

2. The processing system of claim 1, wherein each of the first reference buffer and the second reference buffer are coupled through the demodulator circuit to the same components of the reference transmitter and the charge accumulation circuit.

3. The processing system of claim 1, wherein the demodulator circuit comprises:
   a single demodulator comprising a detector coupled to a low-pass filter, which is in turn coupled to an amplifier;
   wherein an input of the detector is coupled to the output of the integrator; and
   wherein an output of the amplifier is coupled to the input of the first sample-and-hold circuit and the input of the second sample-and-hold circuit, and wherein the second sample-and-hold circuit is configured to sample the first demodulated signal.

4. The processing system of claim 1, wherein each of the first sample-and-hold circuit and the second sample-and-hold circuit is configured to sample and hold with respect to an intermediate voltage reference between a ground voltage and a supply voltage.

5. The processing system of claim 1, wherein the first sample-and-hold circuit is configured to sample and hold with respect to a ground voltage, and wherein the second sample-and-hold circuit is configured to sample with respect to the ground voltage and hold with respect to a supply voltage.

6. The processing system of claim 1, wherein demodulator circuit comprises:
   a first demodulator having an input coupled to the output of the integrator, the first demodulator is configured to generate the first demodulated signal; and
   a second demodulator having an input coupled to the output of the integrator, the second demodulator is configured to generate the second demodulated signal,
   wherein the input of the first sample-and-hold circuit is coupled to an output of the first demodulator, the input of the second sample-and-hold circuit is coupled to an output of the second demodulator, and the second sample-and-hold circuit is configured to sample the second demodulated signal.

7. The processing system of claim 6, wherein
   the first demodulator and the second demodulator each comprises a detector coupled to a low-pass filter, which is in turn coupled to an amplifier;
   wherein an input of the detector in each of the first demodulator and the second demodulator is coupled to the output of the integrator; and wherein an output of the amplifier of the first demodulator is coupled to the input of the first sample-and-hold circuit and an output of the amplifier of the second demodulator is coupled to the input of the second sample-and-hold circuit.

8. The processing system of claim 7, wherein a polarity of the detector in the first demodulator is opposite a polarity of the detector in the second demodulator.

9. An input device, comprising:
a plurality of sensor electrodes; and
a processing system, coupled to the plurality of sensor electrodes, including a plurality of sensor channels coupled to the plurality of sensor electrodes and a single reference channel front end coupled to a reference transmitter through a reference capacitance, the reference channel front end comprising:
a charge accumulation circuit comprising single integrator having an input coupled to the reference transmitter through the reference capacitance, wherein the integrator is configured to generate an integrated signal;
a demodulator circuit having an input coupled to an output of the integrator and configured to demodulate the integrated signal to generate at least one of a first demodulated signal and a second demodulated signal;
a sampling circuit comprising:
a first sample-and-hold circuit comprising an input coupled to an output of the demodulator circuit and configured to sample the first demodulated signal; and
a second sample-and-hold circuit comprising an input coupled to the output of the demodulator circuit and configured to sample the first demodulated signal or the second demodulated signal;
a first reference buffer coupled to an output of the first sample-and-hold circuit, the first reference buffer configured to output a first voltage reference for the input device; and
a second reference buffer coupled to an output of the second sample-and-hold circuit, the second reference buffer configured to output a second voltage reference for the input device, wherein the first voltage reference differs from the second voltage reference.

10. The input device of claim 9, wherein each of the first reference buffer and the second reference buffer are coupled through the demodulator circuit to the same components of the reference transmitter and the charge accumulation circuit.

11. The input device of claim 9, wherein the demodulator circuit comprises:
a single demodulator comprising a detector coupled to a low-pass filter, which is in turn coupled to an amplifier;
wherein an input of the detector is coupled to the output of the integrator; and
wherein an output of the amplifier is coupled to the input of the first sample-and-hold circuit and the input of the second sample-and-hold circuit, and wherein the second sample-and-hold circuit is configured to sample the first demodulated signal.

12. The input device of claim 9, wherein each of the first sample-and-hold circuit and the second sample-and-hold circuit is configured to sample and hold with respect to an intermediate voltage reference between a ground voltage and a supply voltage.

13. The input device of claim 9, wherein the first sample-and-hold circuit is configured to sample and hold with respect to a ground voltage, and wherein the second sample-and-hold circuit is configured to sample with respect to the ground voltage and hold with respect to a supply voltage.

14. The input device of claim 9, wherein demodulator circuit comprises:
a first demodulator having an input coupled to the output of the integrator, the first demodulator is configured to generate the first demodulated signal; and
a second demodulator having an input coupled to the output of the integrator, the second demodulator is configured to generate the second demodulated signal,
wherein the input of the first sample-and-hold circuit is coupled to an output of the first demodulator, the input of the second sample-and-hold circuit is coupled to an output of the second demodulator, and the second sample-and-hold circuit is configured to sample the second demodulated signal.

15. The input device of claim 14, wherein
the first demodulator and the second demodulator each comprises a detector coupled to a low-pass filter, which is in turn coupled to an amplifier;
wherein an input of the detector in each of the first demodulator and the second demodulator is coupled to the output of the integrator; and
wherein an output of the amplifier in each of the first demodulator is coupled to the input of the first sample-and-hold circuit and an output of the amplifier of the second demodulator is coupled to the input of the second sample-and-hold circuit.

16. The input device of claim 15, wherein a polarity of the detector in the first demodulator is opposite a polarity of the detector in the second demodulator.

17. A method of generating reference voltages using a reference channel front end of a capacitive sensing device, comprising:
coupling a transmitter signal from a reference transmitter to the reference channel front end through a reference capacitance;
integrating, with a single integrator of a charge accumulation circuit, an output of the reference capacitance to generate an integrated signal, wherein an input to the charge accumulation circuit is coupled to the reference transmitter through the reference capacitance;
demodulating, with a demodulator circuit, the integrated signal to generate at least one of a first demodulated signal and a second demodulated signal, wherein an input of the demodulator circuit is coupled to an output of the integrator;
sampling, with a first sample-and-hold circuit, the first demodulated signal to generate a first sampled demodulated signal, wherein the first sample-and-hold circuit comprises an input coupled to the output of the demodulated circuit;
sampling, with a second sample-and-hold circuit, the first demodulated signal or the second demodulated signal to generate a second sampled demodulated signal, wherein the second sample-and-hold circuit comprises an input coupled to the output of the demodulated circuit;
buffering, with a first reference buffer, the first sampled demodulated signal to output a first voltage reference, wherein the first reference buffer is coupled to an output of the first sample-and-hold circuit; and
buffering, with a second reference buffer, the second sampled demodulated signal to output a second voltage reference, wherein the second reference buffer is coupled to an output of the second sample-and-hold circuit, and wherein the first voltage reference differs from the second voltage reference.

18. The method of claim 17, wherein the step of demodulating comprises:
   demodulating, filtering, and amplifying the integrated signal to generate the first demodulated signal comprising a high reference voltage; and
   demodulating, filtering, and amplifying the integrated signal to generate the second demodulated signal comprising a low reference voltage.

19. The method of claim 17, wherein the step of demodulating comprises demodulating, filtering, and amplifying the integrated signal to generate the first demodulated signal, and wherein the first sampled demodulated signal is a high reference voltage and the second sampled demodulated signal is a low reference voltage.

20. The method of claim 17, further comprising:
   coupling the first voltage reference and the second voltage reference to an analog-to-digital converter (ADC) in each of a plurality of sensor channels in the capacitive sensing device.

* * * * *

UNITED STATES PATENT AND TRADEMARK OFFICE
CERTIFICATE OF CORRECTION

| | |
|---|---|
| PATENT NO. | : 10,365,749 B2 |
| APPLICATION NO. | : 15/085838 |
| DATED | : July 30, 2019 |
| INVENTOR(S) | : Farzaneh Shahrokhi and Adam L. Schwartz |

Page 1 of 1

It is certified that error appears in the above-identified patent and that said Letters Patent is hereby corrected as shown below:

In the Claims

Column 20, Line 27, Claim 15, after "amplifier" delete "in each".

Signed and Sealed this
Fourteenth Day of April, 2020

Andrei Iancu
*Director of the United States Patent and Trademark Office*